US008301177B2

(12) United States Patent
Yang et al.

(10) Patent No.: US 8,301,177 B2
(45) Date of Patent: Oct. 30, 2012

(54) EFFICIENT PAGING OPERATION FOR FEMTOCELL DEPLOYMENT

(75) Inventors: Xiangying Yang, Portland, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 381 days.

(21) Appl. No.: 12/614,586

(22) Filed: Nov. 9, 2009

(65) Prior Publication Data

US 2010/0226311 A1  Sep. 9, 2010

Related U.S. Application Data

(60) Provisional application No. 61/156,882, filed on Mar. 3, 2009.

(51) Int. Cl.
*H04W 68/00* (2009.01)
(52) U.S. Cl. ........ 455/458; 455/444; 455/433; 455/561; 455/41.2; 455/411; 455/445
(58) Field of Classification Search .................. 370/328, 370/338; 455/458, 444, 433, 445, 518, 418, 455/414.1, 414.2, 561, 41.2, 411
See application file for complete search history.

(56) References Cited

U.S. PATENT DOCUMENTS

| | | | |
|---|---|---|---|
| 7,636,577 B2 | 12/2009 | Mohanty et al. | |
| 7,693,555 B2 | 4/2010 | Srinivasan et al. | |
| 7,720,490 B2 | 5/2010 | Venkatachalam | |
| 7,725,115 B2 | 5/2010 | Venkatachalam | |
| 2007/0087767 A1 | 4/2007 | Pareek et al. | |
| 2007/0097938 A1 | 5/2007 | Nylander et al. | |
| 2007/0105567 A1 | 5/2007 | Mohanty et al. | |
| 2007/0105600 A1 | 5/2007 | Mohanty et al. | |
| 2007/0123287 A1* | 5/2007 | Mock et al. .................. | 455/518 |
| 2007/0191031 A1 | 8/2007 | Mohanty et al. | |
| 2007/0298806 A1 | 12/2007 | Venkatachalam | |
| 2008/0014981 A1 | 1/2008 | Venkatachalam | |
| 2008/0080371 A1 | 4/2008 | Liu et al. | |
| 2008/0084941 A1 | 4/2008 | Mohanty et al. | |

(Continued)

FOREIGN PATENT DOCUMENTS

WO  2010/101837 A2  9/2010
(Continued)

OTHER PUBLICATIONS

International Search Report and Written Opinion received for PCT Patent Application No. PCT/US2010/025786, mailed on Sep. 16, 2010, 9 pages.

(Continued)

*Primary Examiner* — Marcos Torres
(74) *Attorney, Agent, or Firm* — Schwegman, Lundberg & Woessner, P.A.

(57) ABSTRACT

Efficient paging operation for femtocell deployment is generally presented. In this regard, a paging controller is introduced including a wired backbone interface to communicate with a plurality of macro base stations and a plurality of femto base stations, and control logic, the control logic to generate a page for a mobile station, and the control logic to transmit the page over the wired backbone interface to a select subset of all base stations, wherein the select subset of all base stations includes base stations that the mobile station is authorized to access. Other embodiments are also described and claimed.

9 Claims, 3 Drawing Sheets

U.S. PATENT DOCUMENTS

| | | |
|---|---|---|
| 2008/0096614 A1 | 4/2008 | Venkatachalam |
| 2008/0101213 A1 | 5/2008 | Mohanty et al. |
| 2008/0102865 A1 | 5/2008 | Mohanty et al. |
| 2008/0108336 A1 | 5/2008 | Venkatachalam et al. |
| 2008/0153507 A1 | 6/2008 | Taaghol et al. |
| 2008/0175238 A1 | 7/2008 | Venkatachalam |
| 2008/0214213 A1 | 9/2008 | Etemad et al. |
| 2008/0219216 A1 | 9/2008 | Taaghol et al. |
| 2008/0232288 A1 | 9/2008 | Venkatachalam et al. |
| 2008/0233905 A1 | 9/2008 | Mohanty et al. |
| 2008/0279136 A1 | 11/2008 | Taaghol et al. |
| 2008/0305792 A1 | 12/2008 | Khetawat et al. |
| 2008/0305801 A1 | 12/2008 | Burgess et al. |
| 2008/0310386 A1 | 12/2008 | Venkatachalam |
| 2008/0311931 A1 | 12/2008 | Venkatachalam et al. |
| 2009/0003255 A1 | 1/2009 | Mohanty et al. |
| 2009/0003285 A1 | 1/2009 | Mohanty et al. |
| 2009/0040970 A1 | 2/2009 | Ahmadi et al. |
| 2009/0046665 A1 | 2/2009 | Robson et al. |
| 2010/0103825 A1 | 4/2010 | Taaghol et al. |
| 2011/0058542 A1* | 3/2011 | Nylander et al. ............. 370/338 |

FOREIGN PATENT DOCUMENTS

| | | |
|---|---|---|
| WO | 2010/101837 A3 | 11/2010 |

OTHER PUBLICATIONS

International Preliminary Report on Patentability received for PCT Patent Application No. PCT/US2010/025786, mailed on Sep. 15, 2011, 6 pages.

* cited by examiner

EFFICIENT PAGING OPERATION FOR FEMTOCELL DEPLOYMENT

CLAIM OF PRIORITY

The present application claims priority to provisional application 61/156,882 filed on Mar. 3, 2009, which is incorporated by reference in its entirety.

FIELD

Embodiments of the present invention may relate to the field of broadband wireless networks, and more specifically to an efficient paging operation for femtocell deployment.

BACKGROUND

Femtocells are low-power wireless access points that operate in licensed spectrum to connect standard mobile devices to a mobile operator's network using residential DSL or cable broadband connection. See, for example, www.femtoforum.com. Femtocells allow service providers to reduce network operation cost, offer better pricing and extend their service coverage indoors, especially where access would otherwise be limited or unavailable. Dense femtocell deployment, which may include thousands of femtocells (e.g., assuming one femtocell for each house) in a single macrocell, may present a huge overhead to the backbone for idle mode and paging operations.

BRIEF DESCRIPTION OF THE DRAWINGS

Embodiments of the present invention may become apparent from the following detailed description of arrangements, example embodiments, and the claims when read in connection with the accompanying drawings. While the foregoing and following written and illustrated disclosure focuses on disclosing arrangements and example embodiments of the invention, it should be clearly understood that the same is by way of illustration and example only and embodiments of the invention are not limited thereto.

The following represents brief descriptions of the drawings in which like reference numerals represent like elements and wherein.

DETAILED DESCRIPTION

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
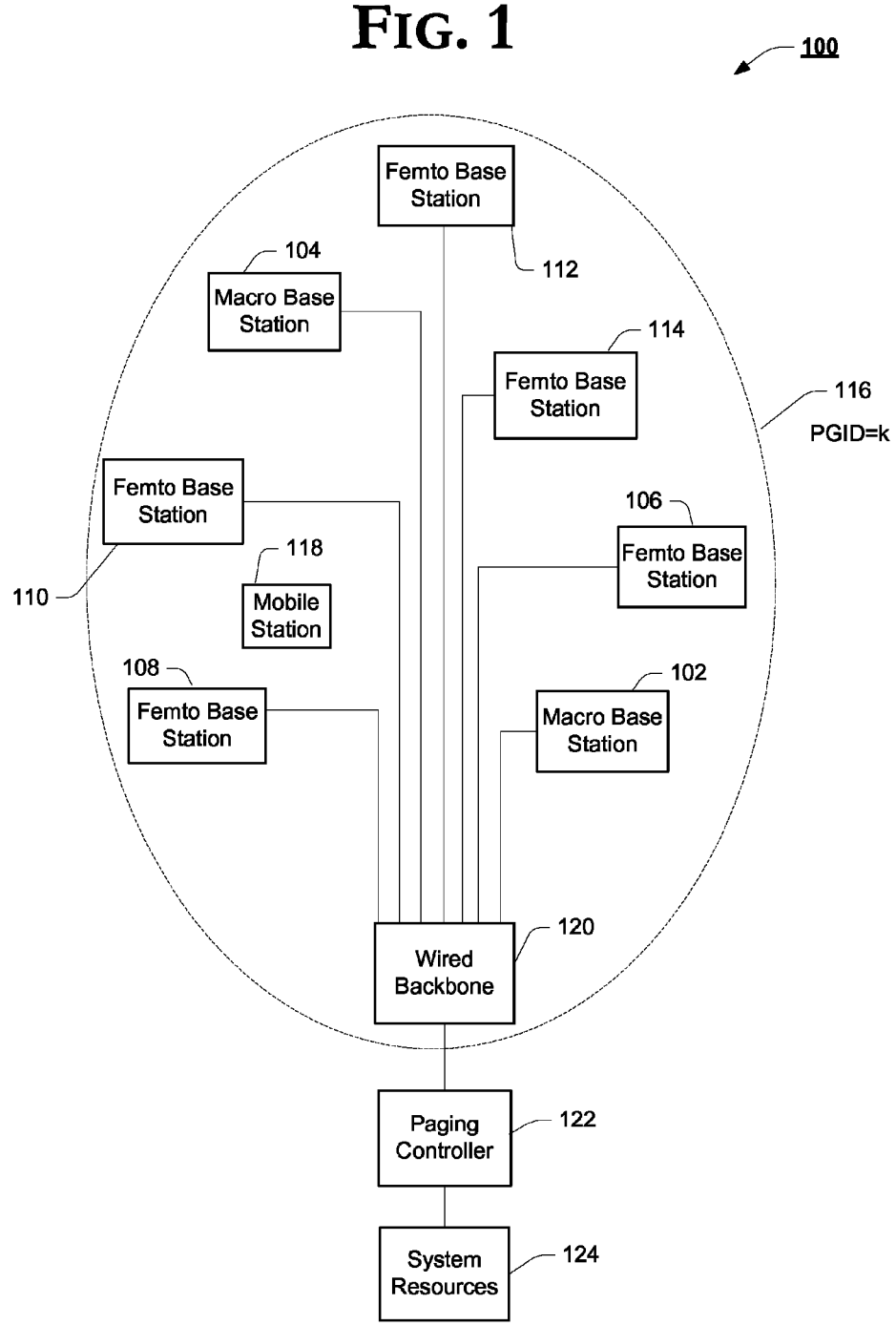
FIG. 1 is a block diagram of an example wireless broadband network suitable for implementing efficient paging operation for femtocell deployment, in accordance with one example embodiment of the invention.

FIG. 1 is a block diagram of an example wireless broadband network suitable for implementing efficient paging operation for femtocell deployment, in accordance with one example embodiment of the invention. Wireless broadband network 100 is intended to represent a broadband wireless network that supports mobile devices. In one embodiment, wireless broadband network 100 complies with a revision of the IEEE 802.16 standard, for example IEEE standard 802.16e-2005. In accordance with the illustrated example embodiment, wireless broadband network 100 may include one or more of macro base stations 102 and 104, femto base stations 106, 108, 110, 112 and 114, service area 116, mobile station 118, wired backbone 120, paging controller 122, and system resources 124 coupled as shown in FIG. 1.

Base stations 102-114 provide wireless broadband network access to mobile stations, such as mobile station 118. Macro base stations 102 and 104 may, for example, represent service provider-maintained base stations on towers or buildings, for example. Femto base stations 106, 108, 110, 112 and 114 may represent lower-power, user-maintained base stations in homes and offices, though the present invention is not so limited. In one embodiment, a service provider may authorize a subscriber to access wireless broadband network 100, for example through mobile station 118, via any macro base station, while access via each femto base station may need to be authorized by the user/owner of the femto base station.

Service area 116 may represent a geographical extent of wireless broadband network 100. In one embodiment, service area 116 may include regions where service from a macro base station is not possible, for example due to terrain or obstructions (not shown). In one embodiment, base stations within service area 116 may share a same paging group ID (PGID) k.

Mobile station 118 represents any mobile device that connects to wireless broadband network 100. For example, mobile station 118 may represent, but is not limited to, a laptop, netbook, cell phone, mobile internet device, tablet, personal data assistant, etc, with wireless broadband capabilities and access. Mobile station 118 may travel with a user such that mobile station 118 becomes further away from some base stations and closer to other base stations.

Wired backbone 120 allow femto and macro base stations of service area 116 to communicate with paging controller 122 and system resources 124. While shown as being a unified backbone for clarity, wired backbone 120 may comprise a variety of mediums and infrastructure in diverse locations, for example, fiberoptic cables, coaxial cables, copper wires, etc.

Paging controller 122 may implement one or more methods for efficient paging as described hereinafter. Paging controller 122 may include control logic and other components as described in reference to FIG. 2.

System resources 124 allow wireless broadband network 100 access to the internet and may include subscriber information and authentication and security services, among other things.

Figure 2:
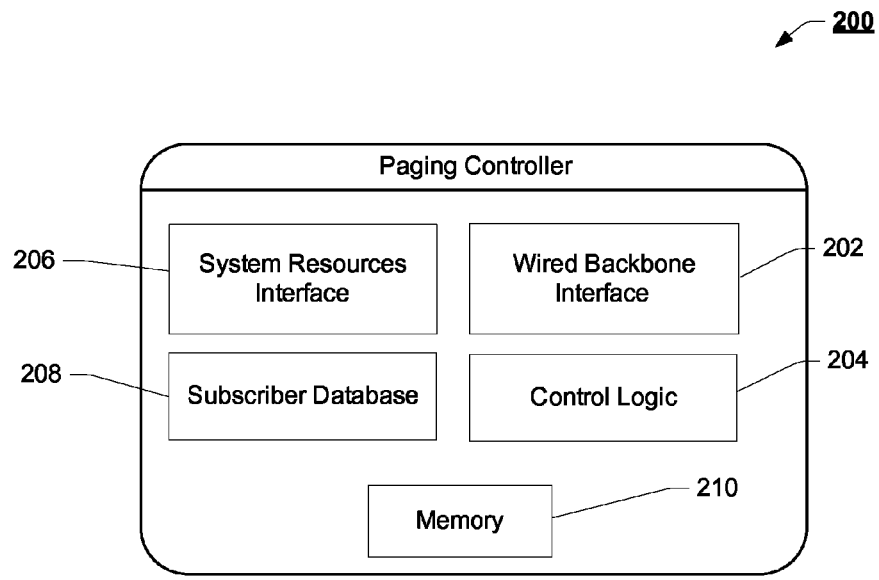
FIG. 2 is a block diagram of an example broadband wireless network paging controller, in accordance with one example embodiment of the invention.

FIG. 2 is a block diagram of an example broadband wireless network paging controller, in accordance with one example embodiment of the invention. Paging controller 200 may include wired backbone interface 202, control logic 204, system resources interface 206, subscriber database 208, and memory 210, as shown. Wired backbone interface 202 may provide paging controller 200 with access to wired backbone 120 and the base stations of service area 116.

Figure 4:
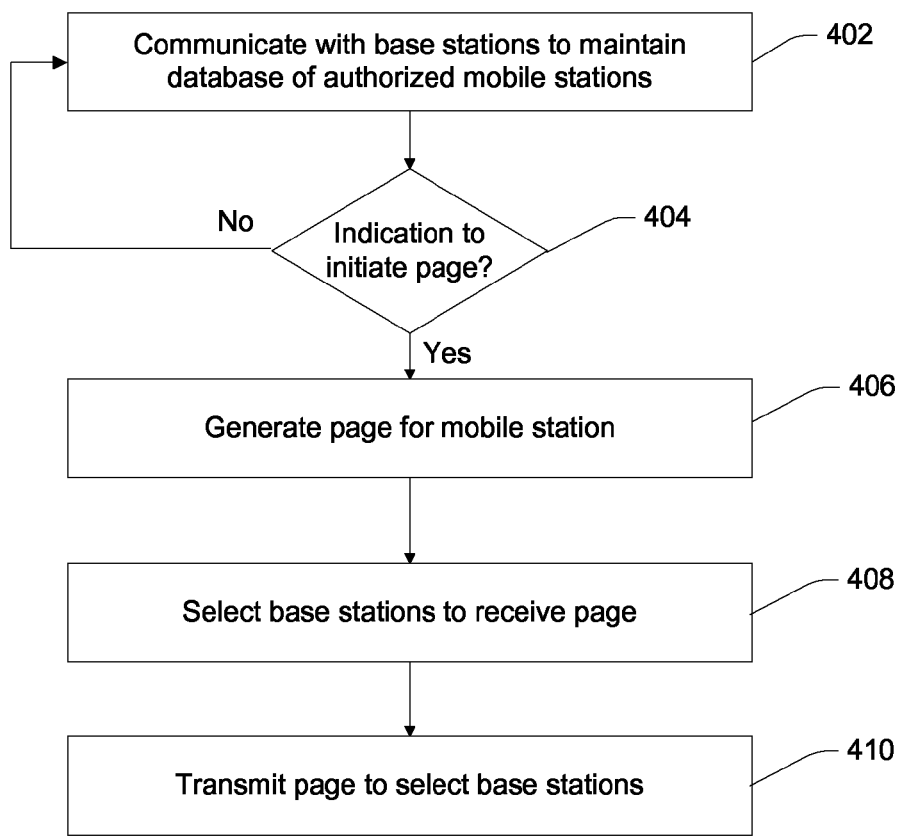
FIG. 4 is a flow chart of an example method of efficient paging operation for femtocell deployment, in accordance with one example embodiment of the invention.

Control logic 204 may allow paging controller 200 to implement a method of efficient paging operation for femtocell deployment, for example as described in reference to FIG. 4. Control logic 204 may represent any type of microprocessor, controller, ASIC, state machine, etc. Control logic 204 may provide paging controller 200 with the ability to generate a page for mobile station 118 (for example in response to an indication to initiate a page received from system resources 124 through system resources interface 206). Control logic 204 may also provide paging controller 200 with the ability to transmit the page for mobile station 118 to a select subset of base stations, without any knowledge as to the location of mobile station 118. In one embodiment, control logic 204 may select a subset of base stations to which to transmit the page for mobile station 118 based on which base stations mobile station 118 is authorized to access. In one embodiment, control logic 204 transmits the page for mobile station 118 to all macro base stations (102 and 104) and only those femto base stations that have specifically authorized mobile station 118.

Figure 3:
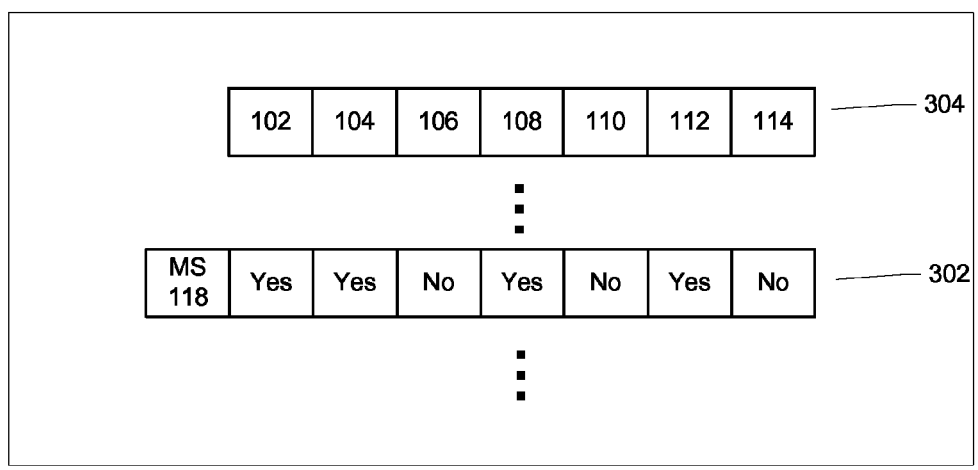
FIG. 3 is a block diagram of an example subscriber database, in accordance with one example embodiment of the invention.

In one embodiment, control logic 204 may select the base stations to which it will transmit a page by accessing subscriber database 208. While shown as being part of paging controller 200, subscriber database 208 may well be located elsewhere, for example within system resources 124. Subscriber database 208 may include entries for mobile stations and the base stations which they are authorized to access, for example as shown in FIG. 3. In one embodiment, control logic 204 may provide paging controller with the ability to communicate with the base stations of broadband wireless network 100 to maintain subscriber database 208. In one embodiment, control logic 204 periodically queries femto base stations 106-114 for any subscriber group changes and updates subscriber database 208 accordingly. In another embodiment, femto base stations 106-114 communicate any subscriber group changes when they occur and control logic 204 updates subscriber database 208 accordingly.

Memory 210 may be present to store (either temporarily or permanently) data or instructions used to implement an example method of efficient paging for femtocell deployment as described herein.

FIG. 3 is a block diagram of an example subscriber database, in accordance with one example embodiment of the invention. In this example, subscriber database 300 includes entry 302 that indicates which of the base stations 304 mobile station 118 is authorized to access. In one embodiment, control logic 204 may not select femto base stations 106, 110 and 114 to receive a page for mobile station 118.

FIG. 4 is a flow chart of an example method of efficient paging operation for femtocell deployment, in accordance with one example embodiment of the invention. Method 400 may be with paging controller 122 communicating (402) with base stations of service area 116 to maintain subscriber database 300. In one embodiment, paging controller 122 periodically queries the femto base stations in service area 116 for any subscriber group changes. In another embodiment, the femto base stations in service area 116 communicate subscriber group changes as they occur and paging controller 122 updates subscriber database 300 accordingly.

Next, if paging controller 122 receives an indication to initiate a page (404) from system resources 124, paging controller 122 may proceed to generate (406) the page for the mobile station, for example mobile station 118. Next, paging controller 122 may select (408) base stations to receive the page. In one embodiment, paging controller 122 will select all macro base stations and only those femto base stations that have authorized access for mobile station 118. In one embodiment, paging controller 122 may access subscriber database 300 to determine that femto base stations 108 and 112 should receive a page for mobile station 118. Lastly, paging controller 122 may transmit (410) the page for mobile station 118 over wired backbone 120 to the select subset of base stations.

Figure 5:
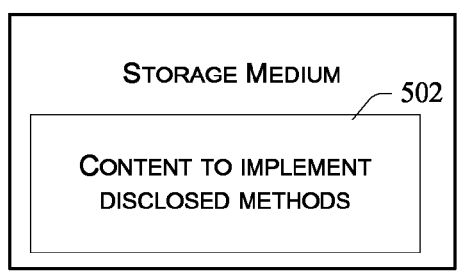
FIG. 5 is a block diagram of an example storage medium including content which, when accessed by a device, causes the device to implement one or more aspects of one or more embodiments of the invention.

FIG. 5 is a block diagram of an example storage medium including content which, when accessed by a device, causes the device to implement one or more aspects of one or more embodiments of the invention. In this regard, storage medium 500 includes content 502 (e.g., instructions, data, or any combination thereof) which, when executed, causes the system to implement one or more aspects of methods described above.

The machine-readable (storage) medium 500 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection).

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A broadband wireless network paging controller comprising:
   a wired backbone interface to communicate with a plurality of macro base stations and a plurality of femto base stations; and
   control logic to generate a page for a mobile station and transmit the page over the wired backbone interface to a select subset of all base stations, the select subset of all base stations including base stations that the mobile station is authorized to access, the control logic to select the select subset by accessing a database listing base stations that the mobile station is authorized to access, the control logic to communicate with base stations to maintain the database, the control logic to periodically query the femto base stations about subscriber group changes.

2. The broadband wireless network paging controller of claim 1, further comprising the control logic to transmit the page over the wired backbone interface to femto base stations sharing a same paging group identification (PGID).

3. The broadband wireless network of claim 1, wherein the select subset includes all macro base stations with paging group ID(s) corresponding to the page.

4. A broadband wireless network comprising:
    a plurality of macro base stations;
    a plurality of femto base stations;
    a mobile station;
    a wired backbone; and
    a paging controller, the paging controller to generate a page for the mobile station and to transmit the page over the wired backbone to a select subset of all base stations, wherein the select subset of all base stations includes base stations that the mobile station is authorized to access, the paging controller to select the select subset by accessing a database listing base stations that the mobile station is authorized to access, the paging controller to communicate with base stations to maintain the database, and the paging controller to periodically query the femto base stations about subscriber group changes.

5. The broadband wireless network of claim 4, further comprising the paging controller to receive updates from the femto base stations about subscriber group changes and to update the database.

6. The broadband wireless network of claim 4, further comprising the paging controller to transmit the page over the wired backbone interface to femto base stations sharing a same paging group identification (PGID).

7. A method comprising:
    receiving an indication to page a broadband wireless mobile station;
    generating a page for the mobile station;
    selecting a subset of all base stations within a service area, wherein the select subset of base stations is based on the base stations that the mobile station is authorized to access; and
    transmitting the page over a wired backbone to the select subset of base stations,
    wherein selecting a subset of all base stations within a service area comprises accessing a database listing base stations that the mobile station is authorized to access, and
    wherein the method further comprises:
    communicating with the base stations to maintain the database; and
    periodically querying the femto base stations about subscriber group changes.

8. The method of claim 7, further comprising receiving updates from the femto base stations about subscriber group changes and to update the database.

9. A broadband wireless network paging controller comprising:
    an interface to communicate with a plurality of macro base stations and a plurality of femto base stations; and
    a processor to generate a page for a mobile station and transmit the page over the interface to a select subset of all base stations, the select subset of all base stations including base stations that the mobile station is authorized to access, the processor to select the select subset by accessing a database listing base stations that the mobile station is authorized to access, the processor to communicate with base stations to maintain the database, the processor to periodically query the femto base stations about subscriber group changes.

* * * * *